(12) United States Patent
Wan et al.

(10) Patent No.: US 10,999,196 B2
(45) Date of Patent: May 4, 2021

(54) GLOBAL REPLICATION MODE FOR OVERLAY RUNTIME STATE MIGRATION

(71) Applicant: VMware, Inc., Palo Alto, CA (US)

(72) Inventors: Da Wan, Beijing (CN); Mukesh Hira, Palo Alto, CA (US); Feng Gu, Palo Alto, CA (US); Jianjun Shen, Palo Alto, CA (US); Pankaj Thakkar, Cupertino, CA (US); Donghai Han, Beijing (CN); Wen Feng Liu, Beijing (CN); Tao Ma, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/384,666

(22) Filed: Apr. 15, 2019

(65) Prior Publication Data

US 2020/0274802 A1    Aug. 27, 2020

(30) Foreign Application Priority Data

Feb. 25, 2019  (WO) ................ PCT/CN2019/076029

(51) Int. Cl.
| | | |
|---|---|---|
| H04L 12/715 | (2013.01) | |
| H04L 12/933 | (2013.01) | |
| H04L 12/931 | (2013.01) | |
| H04L 12/46 | (2006.01) | |

(52) U.S. Cl.
CPC .......... *H04L 45/64* (2013.01); *H04L 12/4633* (2013.01); *H04L 49/10* (2013.01); *H04L 49/70* (2013.01)

(58) Field of Classification Search
CPC ......... H04L 45/64; H04L 49/10; H04L 49/70; H04L 12/4633; H04L 61/103; H04L 47/125; H04L 61/2592; H04L 45/04; H04L 47/825; H04L 45/54; G06F 9/45558; G06F 2009/45595; G06F 2009/4557

See application file for complete search history.

(56) References Cited

U.S. PATENT DOCUMENTS

| | | | | |
|---|---|---|---|---|
| 2013/0332399 | A1* | 12/2013 | Reddy ................... | G06F 11/008 706/12 |
| 2016/0094366 | A1* | 3/2016 | Wang ................... | H04L 12/4625 370/401 |
| 2017/0048129 | A1* | 2/2017 | Masurekar ............. | H04L 45/64 |
| 2017/0118166 | A1* | 4/2017 | Du ........................ | G06F 9/50 |
| 2017/0295093 | A1* | 10/2017 | Moreno .................. | H04L 45/16 |

(Continued)

*Primary Examiner* — Ricky Q Ngo
*Assistant Examiner* — Michael K Phillips
(74) *Attorney, Agent, or Firm* — Patterson + Sheridan, LLP (57) ABSTRACT

Systems and methods of communicating between a plurality of hosts comprising one or more first hosts controlled by a first control plane and one or more second hosts controlled by a second control plane are disclosed herein. Each of the one or more first hosts runs at least one tunneling endpoint of one or more first tunneling endpoints, and each of the one or more second hosts runs at least one tunneling endpoint of one or more second tunneling endpoint. The method includes storing, at each of the one or more first hosts, a global list identifying at least the one or more second tunneling endpoints. The method further includes receiving a packet at one of the one or more first tunneling endpoints. The method further includes replicating, encapsulating, and transmitting the packet to each of the one or more second tunneling endpoints based on the global list.

17 Claims, 9 Drawing Sheets

(56) References Cited

U.S. PATENT DOCUMENTS

| | | | | |
|---|---|---|---|---|
| 2017/0317979 A1* | 11/2017 | Bansal | ................ | H04L 63/0263 |
| 2018/0007005 A1* | 1/2018 | Chanda | ............... | H04L 63/0263 |
| 2018/0219773 A1* | 8/2018 | Li | ....................... | G06F 9/45558 |
| 2018/0309685 A1* | 10/2018 | Srinivasan | .............. | H04L 45/04 |
| 2019/0319883 A1* | 10/2019 | Zhou | ................... | H04L 12/1886 |

* cited by examiner

GLOBAL REPLICATION MODE FOR OVERLAY RUNTIME STATE MIGRATION

CROSS-REFERENCE TO RELATED APPLICATIONS

This application claims the benefit of International Patent Application No. PCT/CN2019/076029, entitled "Global Replication Mode for Overlay Runtime State Migration," filed Feb. 25, 2019, which is incorporated herein by reference in its entirety.

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure. Though certain embodiments are discussed herein with respect to VMs, it should be noted that they may similarly be applicable to other suitable VCIs.

SDN involves the use of a management plane (MP) and a control plane (CP). The management plane is concerned with receiving network configuration input from an administrator or orchestration automation and generating desired state data that specifies how the logical network should be implemented in the physical infrastructure. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

For example, any arbitrary set of VMs in a datacenter may be placed in communication across a logical Layer 2 network by connecting them to a logical switch. Each logical switch corresponds to a virtual network identifier (VNI). The logical switch is collectively implemented by virtual switches on each host that has a VM connected to the logical switch. The virtual switch on each host operates as a managed edge switch implemented in software by the hypervisor on each host. Forwarding tables at the virtual switches instruct the host to encapsulate packets using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain.

For example, the VTEP may be associated with software components, or it may itself, provide Layer 2 tunneling services for encapsulating egress packets from VMs and decapsulating ingress packets to implement a logical overlay network to interconnect VMs running on different hosts as part of the same layer 2 logical overlay network, meaning as part of the same logical layer-2 network/broadcast domain in the logical overlay network. Tunneling services may be implemented using tunneling protocols such as virtual extensible local area network (VXLAN), Stateless Transport Tunneling (STT), Generic Network Virtualization Encapsulation (GENEVE), or Generic Routing Encapsulation (GRE).

It should be noted that the term VTEP originally referred to a "VXLAN tunneling endpoint" and VNI referred to a "VXLAN network identifier." However, while originally the terms "VTEP" and "VNI" referred to "VXLAN" tunneling protocol, they are now often used regardless of the tunneling protocol, and therefore referred to herein as a "virtual" instead. This "backronym" can be misleading as the tunnel is not itself virtual, but does carry logical overlay networking traffic, which is sometimes referred to as virtual network traffic.

In certain datacenters, different sets of hosts may be part of different SDN environments (e.g., controlled by different MPs/CPs). However, hosts that are part of different SDN environments may still be configured to communicate with one another, such as they may each host VMs connected to the same logical switch.

SUMMARY

Herein described are one or more embodiments of a method for communicating between a plurality of hosts comprising one or more first hosts controlled by a first control plane and one or more second hosts controlled by a second control plane, each of the one or more first hosts running at least one tunneling endpoint of one or more first tunneling endpoints, and each of the one or more second hosts running at least one tunneling endpoint of one or more second tunneling endpoints. The method includes storing, at each of the one or more first hosts, a global list identifying at least the one or more second tunneling endpoints. The method further includes receiving a packet at one of the one or more first tunneling endpoints. The method further includes replicating and encapsulating the packet for transmission to each of the one or more second tunneling endpoints based on the global list. The method further includes transmitting the encapsulated packet to each of the one or more second tunneling endpoints.

Also described herein are embodiments of a computer system, wherein software for the computer system is programmed to execute the method described above for communicating between a plurality of hosts comprising one or more first hosts controlled by a first control plane and one or more second hosts controlled by a second control plane.

Also described herein are embodiments of a computer system comprising means for executing the method described above for communicating between a plurality of hosts comprising one or more first hosts controlled by a first control plane and one or more second hosts controlled by a second control plane.

Also described herein are embodiments of a non-transitory computer readable medium comprising instructions to be executed in a computer system, wherein the instructions when executed in the computer system perform the method described above for communicating between a plurality of hosts comprising one or more first hosts controlled by a first control plane and one or more second hosts controlled by a second control plane.

DETAILED DESCRIPTION

Certain embodiments herein provide techniques for ensuring that hosts having VMs that are part of different SDN environments but configured to communicate with one another are able to do so. In particular, certain embodiments herein provide techniques for ensuring that certain broadcast, unknown unicast, or multicast (BUM) packets are replicated to each host as needed across the different SDN environments. Accordingly, even if a VM's addressing (e.g., VM to VTEP mapping) changes in one SDN environment but the other SDN environment is not updated based on the new addressing, the traffic to the VM is not lost. Example BUM packets include one or more of address resolution protocol (ARP) requests, reverse ARP (RARP) requests, gratuitous address resolution protocol (GARP) packets, dynamic host configuration protocol (DHCP) discovery packets, open shortest path first (OPSF) hello packets, other packets with a destination IP address that a source virtual switch/VTEP does not have a mapping to a corresponding destination VTEP for, etc.

Certain embodiments of technologies described herein provide what is referred to herein as a "global replication mode" in which each host (e.g., in a given cluster) and the corresponding CPs of the hosts across different SDN environments are configured with a global VTEP list that includes information about each of the VTEPs on each of the hosts. Accordingly, each host and CP has the same global VTEP list. Accordingly, in certain embodiments, when a source VTEP receives a BUM packet, the source VTEP sends the BUM packet to each VTEP in the global VTEP list, ensuring the BUM packet reaches its destination.

Figure 1:
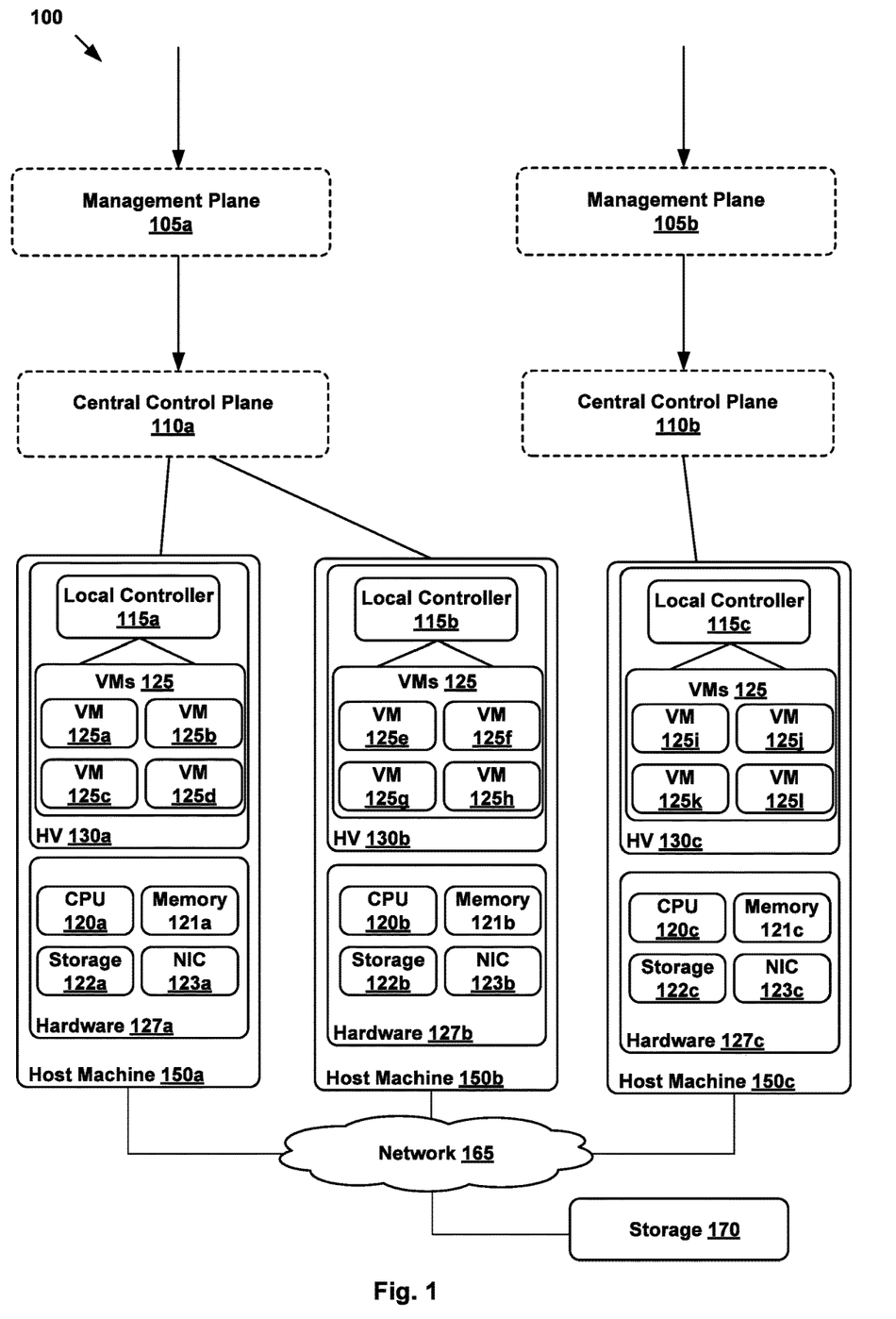
FIG. 1 illustrates an example block diagram of a network control system for a virtual network, according to one example embodiment.

FIG. 1 is a block diagram of a network control system 100 including a management plane (MP) 105a, a central control plane (CCP) 110a, a MP 105b, and a CCP 110b. MP 105a and CCP 110a are associated with a first SDN environment. MP 105b and CCP 110b are associated with a second SDN environment.

Network control system 100 further includes host machines ("hosts") 150a and 150b in the first SDN environment and coupled to MP 105a and CCP 110a. Network control system 100 further includes host 150c in the second SDN environment and coupled to MP 105b and 110b. It should be noted that though certain embodiments are described with a particular number of hosts in a particular number of SDN environments, the techniques discussed herein are applicable to any number of hosts (e.g., having any number of VMs coupled to any number of logical switches) in any number of SDN environments. The hosts are physical computing devices that support the execution of virtual machines (VMs) 125a-125l (collectively referred to as VMs 125 and individually referred to as VM 125). Each of the hosts 150a-150c includes a local controller (also called the local control plane (LCP)) 115a, 115b, and 115c.

Hosts 150a-150c (collectively referred to as hosts 150 and individually referred to as host 150) are typically on server grade hardware platforms ("hardware"), such as hardware 127a-127c, respectively. An example of a server grade hardware platform is the x86 architecture platform. Hosts 150a-150c may be geographically co-located servers on the same rack or on different racks in any location within a data center. Each of hosts 150a-150c is configured with a virtualization layer, referred to herein as a hypervisor (also referred to as HV). Each of hypervisors 130a-130c abstracts processor, memory, storage, and networking resources of a corresponding hardware platform 127a-127c into multiple virtual machines 125. VMs 125 on the same host 150 may use any suitable guest operating system(s) and run concurrently with the other VMs 125.

Hypervisor 130 architecture may vary. In some embodiments, hypervisor 130 is installed as system level software directly on the hosts 150 (often referred to as a "bare metal" installation) and conceptually interposed between the physical hardware and the guest operating systems executing in VMs 125. Alternatively, hypervisor 130 may conceptually run "on top of" a conventional host operating system in the server. In some implementations, hypervisor 130 may comprise system level software as well as a privileged VM (not shown), such as a "Domain 0" or "Root Partition" VM, that has access to the physical hardware resources of the host 150. In such implementations, a virtual switch, VTEP, etc., along with hardware drivers, may reside in the privileged VM.

Hardware platform 127 of each host 150 includes components of a computing device such as one or more processors (CPUs) 120, a system memory 121, a storage system 122, a network interface (referred to in FIG. 1 as "NIC") 123, a host bus adapter (HBA) (not shown), and other I/O devices such as, for example, a mouse and keyboard (not shown). Processor 120 is configured to execute instructions such as executable instructions that perform one or more operations described herein. The executable instructions may be stored in memory 121 and in storage system 122. Network interface 123 enables host 150 to communicate with other devices via a communication medium, such as network 165. Network interface 123 may include one or more network adapters or ports, also referred to as Network Interface Cards (NICs), for connecting to one or more physical networks. Network 165 may be a local area network ("LAN"), a wide area network ("WAN"), or a network of networks, such as the Internet.

Memory 121 is hardware for allowing information, such as executable instructions, configurations, and other data, to be stored and retrieved. Memory 121 is where programs and data are kept when processor 120 is actively using them.

Memory 121 may be volatile memory or non-volatile memory. The HBA of a host 150 couples the host to one or more external storages, such as storage 170, which may be a storage area network (SAN) or a distributed virtual SAN. Other external storages that may be used include a network-attached storage (NAS) and other network data storage systems, which may be accessible via network interface 123. Storage system 122 represents persistent storage device(s). Storage 122 may be one or more hard disks, flash memory modules, solid state disks, and/or optical disks. Data on storage disks of storage 122 may be organized into blocks, and each block on storage system 122 may be addressable. Although storage 122 is shown as being local to host 150, storage 122 may be external to host 150, such as by connection via the host 150's HBA. In addition, storage systems 122*a*-122*c* may be used as part of a storage virtualization platform, such as virtual SAN (VSAN).

Hypervisors 130*a*-130*c* abstract processor, memory, storage, and/or networking resources of hosts 150*a*-150*c*, respectively, into multiple VMs 125*a*-125*l*, 125*e*-12*h*, and 125*i*-125*l* that can run side-by-side on the same hosts 150*a*-150*c*. That is, the virtualization software partitions physical hosts 150*a*-150*c* into multiple secure and portable VMs 125. Each VM 125 may represent a complete virtual system—with virtual processors, virtual memory, virtual networking interface, virtual disk storage, and its own BIOS. For example, each VM 125 comprises a software-based virtual network adaptor (not shown), also referred to as a virtual network interface card (VNIC) that is logically connected to instantiations of the control plane (e.g., local controllers 115*a*-115*c*) running on host machines 150*a*-150*c* and provides network access for the VM 125. Each VM 125's VNIC is typically connected to a corresponding controller 115 through a virtual switch.

Though shown as single entities, it should be understood that MP 105*a* and CCP 110*a* (and similarly MP 105*b* and CCP 110*b*) may be implemented as distributed or clustered applications or components. For example, MP 105*a* may include multiple computing devices that implement management plane functions, and a CCP 110*a* may include multiple central (or distributed) controller computers, virtual machines, containers, or processes that implement CCP functions. An example of a computing device may include a VM 125 executing on a host 150. In such an example, multiple VMs 125 running on the same or different hosts 150 may implement management and/or control plane functions.

In certain embodiments, each of MP 105*a* (and similarly MP 105*b*) is responsible for receiving network configuration input through an interface (e.g., an application programming interface or user interface). For example, users (e.g., network administrators) may input network configuration data through a user interface such as a command-line interface or graphical user interface. Network configuration input may, for example, comprise configuration data indicative of how multiple endpoints, such as VM 125, running on different hosts 150 may be connected through a logical Layer-2 or overlay network. More specifically, in certain embodiments, each logical network configuration for each logical network includes data defining one or more endpoints and the connections between the endpoints. For example, network configuration input may include information describing logical entities, such as logical ports (e.g., assigning media access control (MAC) and/or Internet protocol (IP) addresses to the logical ports) for logical networking elements, how logical networking elements are interconnected, various service rules (such as distributed firewall rules) to be enforced at one or more logical networking elements, etc.

Based on network configuration input, MP 105*a* generates desired state data that specifies how the logical network should be implemented in the physical infrastructure. CCP 110*a* (and similarly CCP 110*b*) then updates/implements the logical network based on the desired state information through local controllers 115*a* and 115*b*. For example, CCP 110*a* is responsible for managing and maintaining information about virtual machines, virtual switches, virtual routers, VTEPs, etc. implemented on host machines controlled by CCP 110*a*. Further, CCP 110*a* is responsible for configuring physical network elements implemented by host machines 150*a*-150*b* to ensure that the defined logical network topologies and policies are properly implemented. When users provide configuration changes (e.g., creating or deleting logical entities, modifying properties of logical entities, changing relationships between logical entities, etc.), the changes to the desired state are distributed as updates to CCP 110*a*. Local controllers 115*a*-*b* are responsible for translating data received from CCP 110*a* into configuration data formatted for their respective VMs 125. In some embodiments, the local controller is a daemon that operates in the virtualization software of the host machine.

Figure 2:
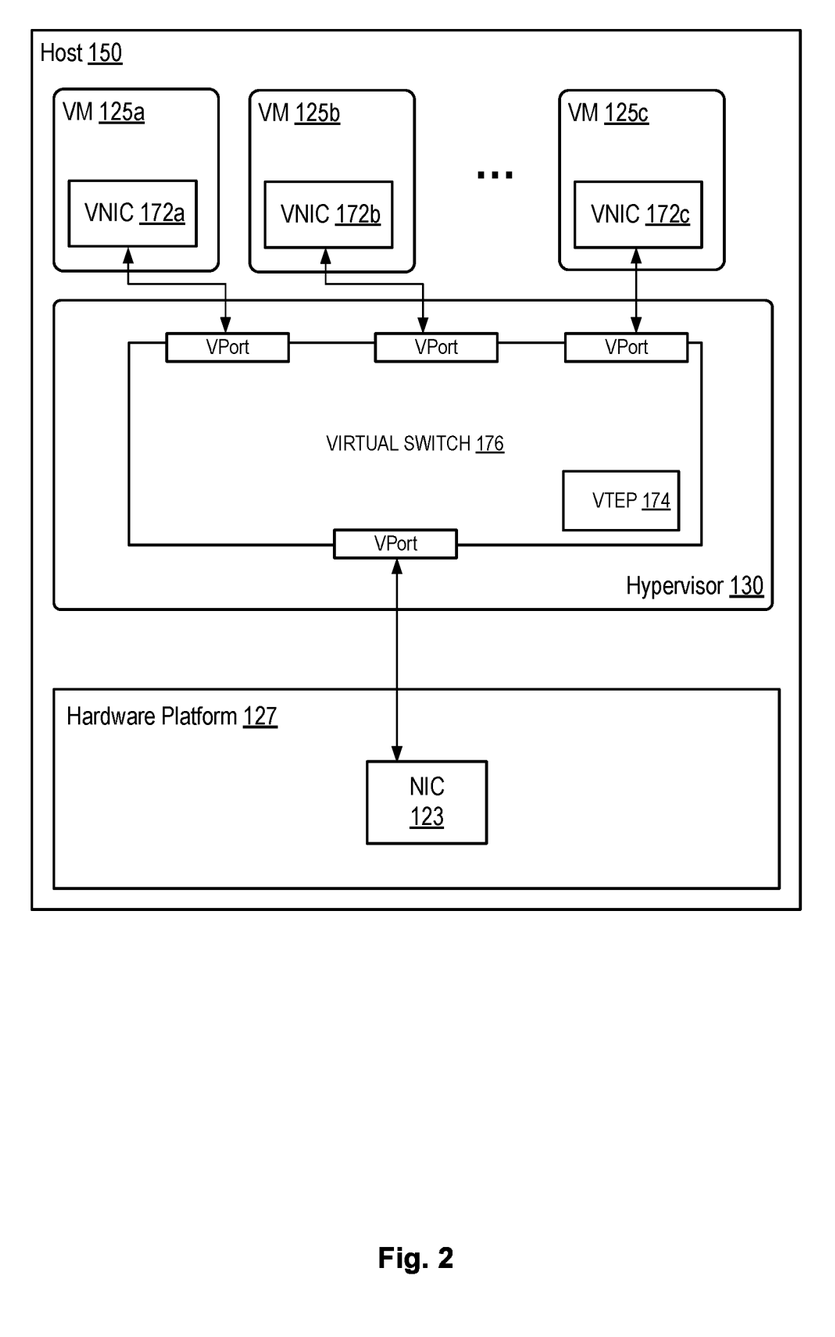
FIG. 2 depicts a block diagram showing details of a host running a hypervisor, according to an embodiment.

FIG. 2 depicts a block diagram showing details of a host 150 running a hypervisor 130, according to an embodiment. Hypervisor 130 may include a virtual switch 176, which serves as an interface between the hosted virtual machines 125 running on host 150, NIC 123, as well as other physical resources available on host 150. VMs 125 of FIG. 2 are analogous to and substantially similar to VMs 125 of FIG. 1. Hypervisor 130 includes VTEP 174, which may be implemented in software by virtual switch 176, or outside of virtual switch 176 (e.g., as coupled to a virtual port of virtual switch 176) and functionally coupled to virtual switch 176 using forwarding tables. Accordingly, VTEP 174 is responsible for providing VTEP services for each of the VMs 125 on the same host machine 150 as VTEP 174.

Each of the virtual machines 125 may include a virtual network interface card (VNIC) 172, which is responsible for exchanging packets between the virtual machine 125 and hypervisor 130. VNICs 172 may be, in some cases, a software abstraction of a physical network interface card. Each virtual machine 125 is connected to a virtual port (vport) provided by virtual switch 176, and virtual switch 176 is connected to physical network interface 123 to allow network traffic to be exchanged between virtual machines 125 executing on host machine 150 and other network destinations such as virtual machines hosted by other host machines.

A logical network is implemented using VTEPs for encapsulating data packets that are generated by VMs 125 or hypervisor 130 for delivery through the underlying data network. For example, a source VM 125 running on host 150 may generate a packet for a destination VM on another host. The packet may include in a header a source address (e.g., IP/MAC address) of the source VM 125, and a destination address of the destination VM on the other host. The source VM 125 may send the packet to virtual switch 176.

Having received the packet, virtual switch 176 determines that the destination VM is not directly coupled to the virtual switch 176 and thus forwards the packet to VTEP 174 to encapsulate the packet received from source VM 125 to generate an encapsulated packet. In particular, VTEP 174 may add a new header (referred to as an "outer header") to the original packet to generate the encapsulated packet (referred to as an "outer packet"). The original packet encapsulated by VTEP 174 may be referred to as an "inner packet" and the header of the original packet may be referred to as an "inner header." The VTEP 174 may include a source address of the VTEP 174 (e.g., source VTEP) in the outer header, and a destination address of a destination VTEP associated with the destination VM. The VTEP 174 may then forward the encapsulated packet back to virtual switch 176, which sends the encapsulated packet out of host 150 via NIC 123 based on the destination address in the outer header.

The destination VTEP 174 receives the encapsulated packet and decapsulates the encapsulated packet to extract the original packet. Based on the destination IP address in the header of the original packet, the destination VTEP 174 forwards the original packet to the destination VM 125.

As discussed, host 150*a* and host 150*b* are in a first SDN environment, which is maintained by MP 105*a* and CCP 110*a*. In particular, MP 105*a* is configured to maintain a static configuration of the logical overlay network of the first SDN environment, such as connectivity of VMs to logical switches, logical routers, etc. Further, CCP 110*a*, based on the static configuration, determines certain runtime state information for implementing the logical overlay network on hosts. The runtime state information includes configuration of forwarding tables for virtual switches, VTEP tables, MAC/VTEP mappings, etc. The static configuration may not change during operation of the overlay network. However, the runtime state information may change, as further discussed herein.

In certain embodiments, each of hosts 150*a*, 150*b*, and 150*c* may initially have been part of the first SDN environment. A migration procedure may then be started to move hosts 150*a*-150*c* to the second SDN environment. During the transition phase, not all hosts are migrated at once, meaning some hosts may be in different SDN environments and still need to communicate with one another. Accordingly, FIG. 1 may be illustrative of such a transition phase where host 150*c* has been migrated to the second SDN environment, while hosts 150*a* and 150*b* are still part of the first SDN environment. Though certain embodiments are discussed herein with respect to hosts being in different SDN environments due to a migration, it should be noted that the techniques discussed herein may be used to enable VMs on hosts in different SDN environments for any reason to communicate with each other, such as being in different SDN environments due to different ownership of hosts, etc.

In order for VMs on hosts in different SDN environments to communicate with one another, the VTEPs on each of the hosts need to be configured to ensure that packets are encapsulated and sent to the appropriate destination VTEP on the host running the destination VM. Thus, one of the major runtime states that need to be coordinated between the different SDN environments are VTEP tables, as further discussed herein. It should be noted that though certain embodiments discussed herein are for coordinating VTEP tables between different SDN environments, the techniques may similarly be applied for other runtime state information.

Prior to migration from the first SDN environment to the second SDN environment, a migration coordinator (not shown), which may itself be a VM, an application running on a computing device, etc., requests and receives from MP 105*a*/CCP 110*a* static configuration and runtime state information of the first SDN environment. The migration coordinator further pushes the static configuration and runtime state information of the first SDN environment to the MP 105*b*/CCP 110*b* of the second SDN environment.

After the MP 105*b*/CCP 110*b* receives the static configuration and runtime state information, host migration begins. The host to be migrated, in this case host 150*c*, is disconnected from the MP 105*a*/CCP 110*a*, and then connected to MP 105*b*/CCP 110*b*. MP 105*b*/CCP 110*b* pushes static configuration and runtime state information related to host 150*c* received from MP 105*a*/CCP 110*a* to host 150*c*, and then traffic to/from host 150*c* is resumed. For example, host 150*c* is then configured with the appropriate VTEP tables to ensure connectivity with hosts 150*a* and 150*b*.

Any change in the topology of the first SDN environment after host migration begins is only communicated to MP 105*a*/CCP 110*a*. Further, any change in topology of the second SDN environment after host migration begins is only communicated to MP 105*b*/CCP 110*b*. Such topology change may affect the configuration of VTEP tables at hosts in the different SDN environments. However, the VTEP tables in an SDN environment may only be updated when the topology change is communicated to the MP/CCP of the SDN environment. Accordingly, VTEP tables in an SDN environment may become outdated due to changes in another SDN environment in that they do not accurately reflect the connectivity between the SDN environments, thereby causing connectivity issues, as further discussed herein.

Certain embodiments are discussed with respect to topology changes in an SDN environment due to migration of a VM from one host to another, VM creation, VM deletion, changes in VM to VTEP association, etc., but could be used for any similar topology change.

Figure 3:
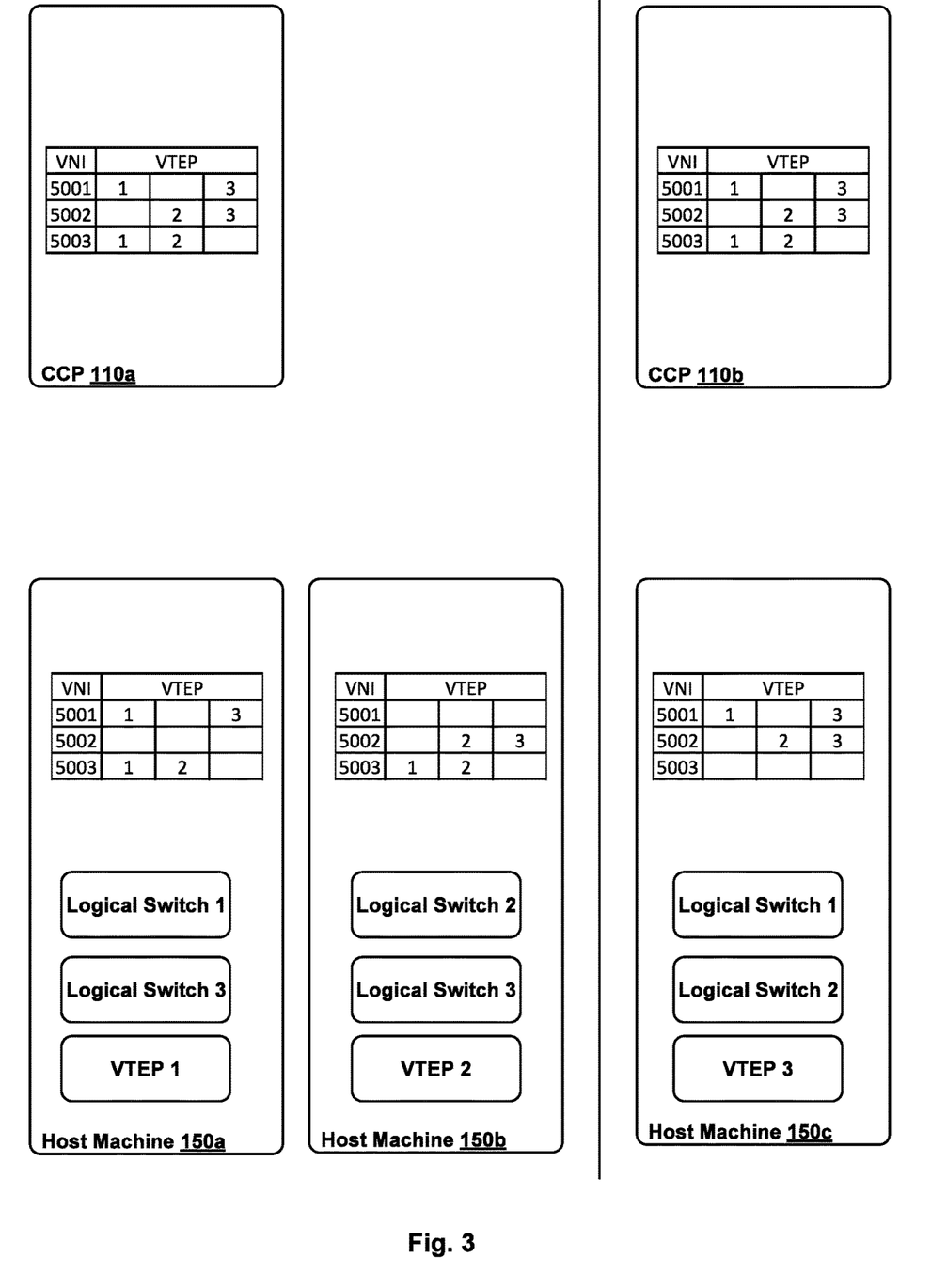
FIG. 3 illustrates example VTEP tables at hosts, according to an embodiment.

FIG. 3 illustrates example VTEP tables at hosts 150*a*-150*c*. As shown hosts 150*a* and 150*b* are associated with CCP 110*a* and are part of the first SDN environment. Further, host 150*c* is associated with CCP 110*b* and is part of the second SDN environment. In the example, host 150*a* includes VTEP 1, host 150*b* includes VTEP 2, and host 150*c* includes VTEP 3.

Further, host 150*a* includes one or more VMs coupled to a first logical switch (e.g., implemented at host 150*a* by its virtual switch and VTEP 1) having VNI 5001 and a third logical switch (e.g., implemented at host 150*a* by its virtual switch and VTEP 1) having VNI 5003. Host 150*b* includes one or more VMs coupled to a second logical switch (e.g., implemented as a virtual switch and VTEP 2) having VNI 5002 and the third logical switch (e.g., implemented as a virtual switch and VTEP 2). Host 150*c* includes one or more VMs coupled to the first logical switch (e.g., implemented as a virtual switch and VTEP 3) and the second logical switch (e.g., implemented as a virtual switch and VTEP 3).

As shown, CCP 110*a* includes a VTEP table. The VTEP table indicates which VTEP is associated with which logical switch. For example, the first logical switch having VNI 5001 is associated with VTEP 1 and VTEP 3 based on the first logical switch being in part implemented by VTEP 1 and VTEP 3. Similarly, the second logical switch having VNI 5002 is associated with VTEP 2 and VTEP 3 based on the second logical switch being in part implemented by VTEP 2 and VTEP 3. Further, the third logical switch having VNI 5003 is associated with VTEP 1 and VTEP 2 based on the third logical switch being in part implemented by VTEP 1 and VTEP 2.

In certain embodiments, a VTEP table includes a VNI associated with data identifying/associated with one or more VTEPs. The VNI, in certain aspects, instead may be replaced by a different identifier of a logical switch. The data identifying a VTEP can include one or more of an IP address of the VTEP, a MAC address of the VTEP, a segment ID (e.g., network address of an IP subnet) of the VTEP, an optional VTEP label (e.g. a globally unique number allocated by MP), an optional overlay encapsulation type (e.g., VXLAN, GENEVE, STT, etc.), etc. In certain embodiments, the data identifying the VTEP includes a device name indicating a network interface (e.g., vmkernel NIC) associated with it.

In certain embodiments, each VTEP table includes one VNI associated with one or more VTEPs. Accordingly, in certain embodiments, a VTEP table as discussed associating different VNIs with different VTEPs may actually be implemented as multiple VTEP tables.

In certain embodiments, CCP 110b includes the same VTEP table as CCP 110a and the VTEP tables at CCP 110a and 110b are coordinated, e.g., synchronized. For example, CCP 110b may have received the same VTEP table from CCP 110a prior to a migration without any additional topology changes after. Further, each of hosts 150a-150c includes a VTEP table derived from the same VTEP table at each of CCP 110a and 110b that has the mappings to VTEPs for logical switches implemented at that particular host 150. Based on the VTEP tables shown, all of the VMs connected to each of the logical switches shown are able to communicate properly as the VTEP tables are all accurate.

Figure 4:
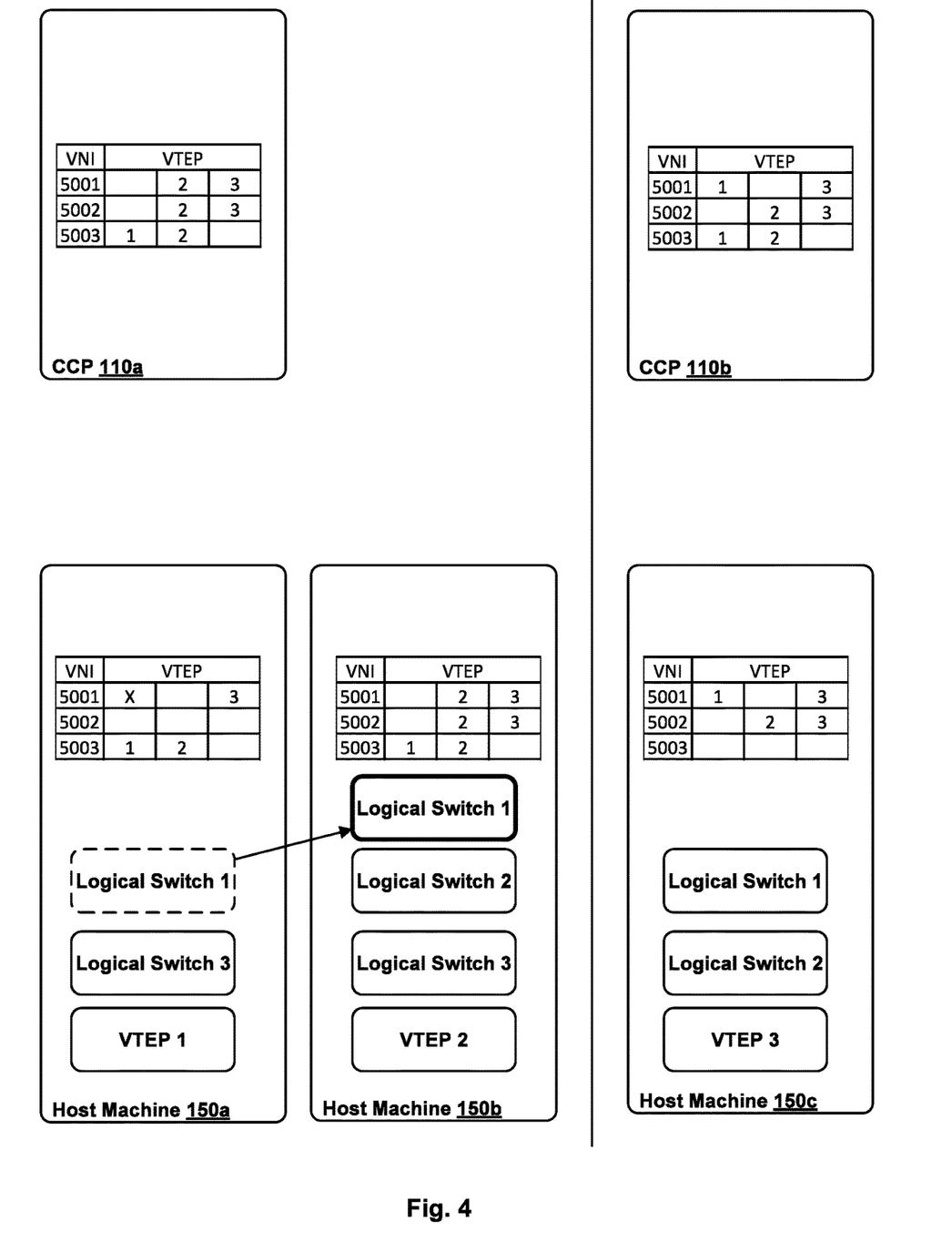
FIG. 4 illustrates example VTEP tables at hosts based on a VM moving from one host to another, according to an embodiment.

FIG. 4 illustrates example VTEP tables at hosts 150a-150c based on a VM moving from one host to another. In particular, FIG. 4 illustrates an example of traffic failure caused by such a topology change when different hosts are in different SDN environments.

For example, the VTEP tables may start as shown in FIG. 3. Then, one or more VMs on host 150a that are coupled to logical switch 1 are moved to host 150b, such that VTEP 1 no longer implements part of logical switch 1, and VTEP 2 now implements part of logical switch 1. Accordingly, each of host 150a and 150b inform CCP 110a of the topology change, and the VTEP tables at each of hosts 150a and 150b, and CCP 110a are updated as shown to reflect the topology change. However, since CCP 110b and host 150c are in a different SDN environment, the VTEP tables at CCP 110b and host 150c are not updated to reflect the topology change. This can cause connectivity issues. In particular, VTEP 3 on host 150c is configured to send packets for logical switch 1 to host 150a, and not host 150b as reflected by the topology change, meaning VMs connected to logical switch 1 on host machine 150b will not receive certain traffic from host machine 150c.

Figure 5:
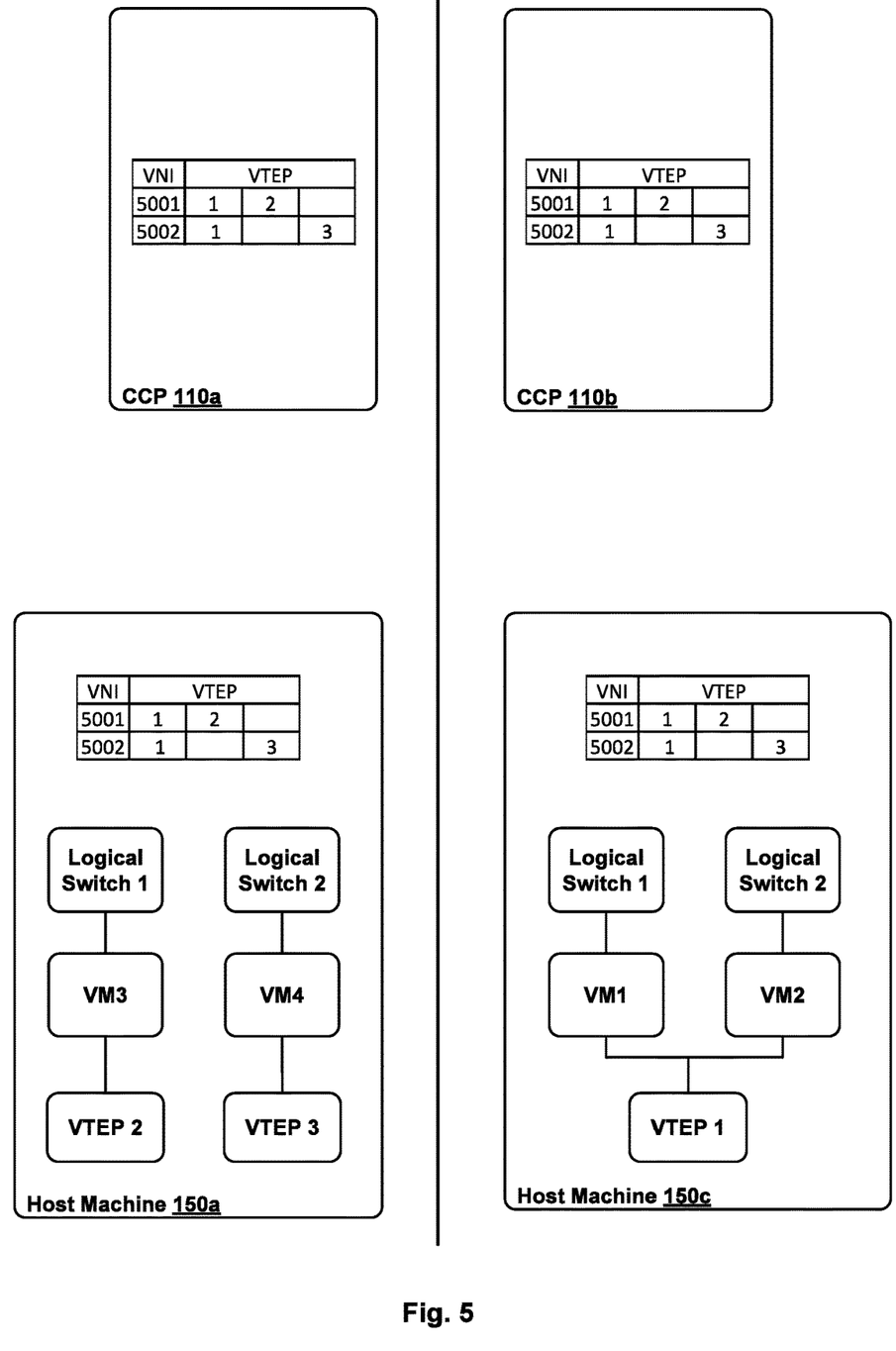
FIGS. 5-6 illustrate example VTEP tables at hosts based on a change in VM to VTEP mapping, according to an embodiment.
Figure 6:
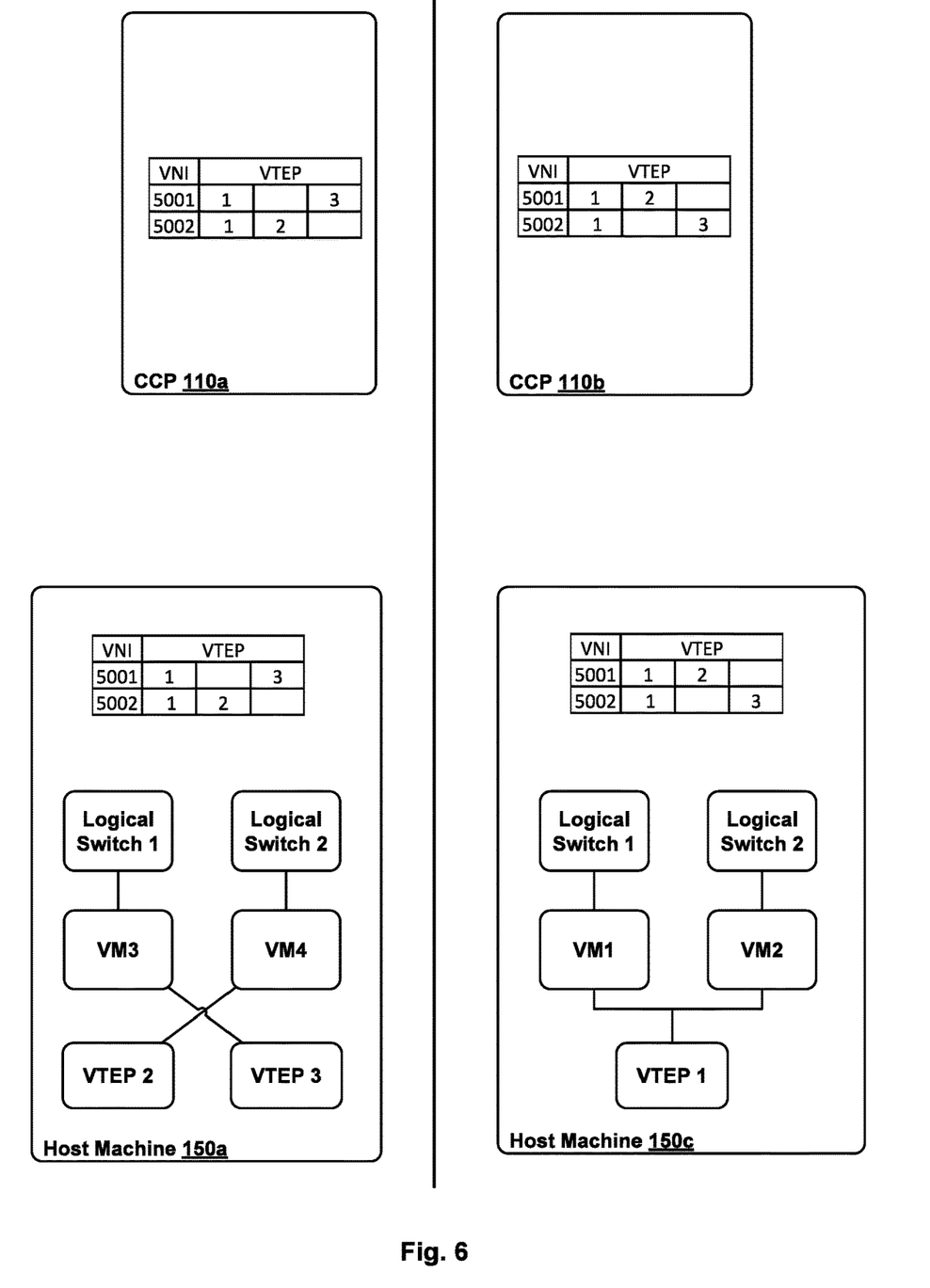

FIGS. 5-6 illustrate example VTEP tables at hosts 150a and 150c based on a change in VM to VTEP mapping (e.g., for multi-VTEP teaming). In particular, FIG. 5 illustrates an initial configuration of VTEP tables at hosts 150a and 150c, and FIG. 6 illustrates the configuration of VTEP tables after the change. FIGS. 5-6 illustrate an example of traffic failure caused by such a topology change when different hosts are in different SDN environments.

As shown in FIG. 5, host 150a is associated with CCP 110a and is part of the first SDN environment. Further, host 150c is associated with CCP 110b and is part of the second SDN environment. In the example, host 150a includes VTEP 2 and VTEP 3, and host 150c includes VTEP 1. For example, host 150a may use multi-VTEP teaming where multiple VTEPs are on a single host and associated with different VMs on the host, such as for load balancing, etc.

Host 150a includes VM3 coupled to a first logical switch (e.g., implemented at host 150a as a virtual switch and VTEP 2) having VNI 5001 and VM4 coupled to a second logical switch (e.g., implemented at host 150a as a virtual switch and VTEP 3) having VNI 5002. Host 150c includes VM1 coupled to the first logical switch (e.g., implemented as a virtual switch and VTEP 1) and VM2 coupled to the second logical switch (e.g., implemented as a virtual switch and VTEP 1). Accordingly, VM3 is mapped to VTEP 2, VM4 is mapped to VTEP 3, and each of VM1 and VM2 are mapped to VTEP 1. The VTEP tables are configured as shown at each of CCP 110a, CCP 110b, host 150a, and host 150c. Based on the VTEP tables shown, all of the VMs connected to each of the logical switches shown are able to communicate properly as the VTEP tables are all accurate.

FIG. 6 illustrates a change in VM to VTEP mapping from FIG. 5, in that VM3 is now mapped to VTEP 3 instead of VTEP 2, and VM4 is mapped to VTEP 2 instead of VTEP 3. For example, logical switch 1 is now implemented in part by VTEP 3 on host 150a, and logical switch 2 is now implemented in part by VTEP 2 on host 150a. Based on the change in topology at host 150a, the VTEP tables for CCP 110a and host 150a are updated as shown. However, since CCP 110b and host 150c are in a different SDN environment, the VTEP tables at CCP 110b and host 150c are not updated to reflect the topology change. This can cause connectivity issues. For example, VTEP 1 on host 150c is configured to send packets for VM3 on logical switch 1 to VTEP 2 on host 150a, and not to VTEP 3, meaning VM3 will not receive the packets.

Accordingly, certain embodiments herein provide a global replication mode in which each host (e.g., in a given cluster) and the corresponding CCPs of the hosts across different SDN environments are configured with a global VTEP list that includes information about each of the VTEPs on each of the hosts. Accordingly, each host and CCP has the same global VTEP list. For example, the global VTEP list on each host includes a list of all VTEPs across all of the hosts, even if the VTEP is not associated with a logical switch implemented at the host. Accordingly, in certain embodiments, when a source VTEP receives a BUM packet, the source VTEP sends the BUM packet to each VTEP in the global VTEP list, ensuring the BUM packet reaches its destination. Though certain embodiments are discussed with respect to sending BUM packets to each VTEP in the global VTEP list, in some other embodiments, other types of packets may additionally or alternatively be sent to each VTEP in the global VTEP list. In some embodiments, only BUM packets are sent using the global VTEP list.

In certain embodiments, each VTEP table, in multiple SDN environments that are in communication with one another as discussed, includes a global VTEP list that indicates all the VTEPs in the multiple SDN environments. In certain embodiments, the global VTEP list is implemented in the VTEP table as having a global identifier (e.g., GLB) for its VNI, and that global identifier is associated with each of the VTEPs in the VTEP table. In certain embodiments, when a source VM generates and transmits a BUM packet, the source VTEP associated with the source VM, using the global VTEP list, replicates the BUM packet for transmission to all the other VTEPs as destination VTEPs. In particular, the source VTEP encapsulates a copy of the BUM packet for each of the other VTEPs and sets a destination address (e.g., MAC and/or IP) of the outer header as that of the destination VTEP, and the source address of the outer header as that of the source VTEP. Accordingly, each of the other VTEPs receives the encapsulated BUM packet, decapsulates it, and passes it on to the appropriate destination such as one or more VMs via one or more virtual switches as discussed. This ensures that the BUM packet is received at the appropriate destination, regardless of the VTEP associated with the destination or the host that the destination resides on. In certain aspects, the destination VTEPs only pass the BUM packet to any virtual switches implementing logical switches with the same VNI to which the source VM is coupled and sent the BUM packet over.

In certain embodiments, a VTEP includes a setting/flag (referred to as a global replication mode flag) that indicates whether or not to use global replication mode. For example, when the flag is set, the VTEP uses global replication mode and uses the global VTEP list for sending traffic. When the flag is not set, the VTEP sends traffic according to the standard VTEP table based on the logical switches associated with VTEPs as previously discussed and does not use the global VTEP list. In certain embodiments, the CCP associated with the host that includes the VTEP configures the global replication mode flag.

In certain embodiments, each host is configured to report its local VTEPs to its CCP. In certain embodiments, each host reports its local VTEPs as associated with the global ID. The CCP can then create the global VTEP list as including all the local VTEPs reported for all the hosts, such as the global ID in the VTEP table associated with all VTEPs across all the hosts. The CCP then configures the global VTEP list at each of the hosts, such as by configuring the VTEP tables at each host with the global ID in the VTEP table associated with all VTEPs across all the hosts.

In certain embodiments, the CCP derives the global VTEP list based on the existing VTEP list. For example, the CCP determines all the VTEPs associated with any logical switch in the VTEP list, and includes all such VTEPs in the global VTEP list.

In certain embodiments, the CCP in one SDN environment configures the CCP in another SDN environment with its global VTEP list, such as prior to a migration, so each CCP of each SDN environment includes the global VTEP list and can configure its associated hosts accordingly. In certain embodiments, CCPs in different SDN environments create SDN environment specific global VTEP lists for their separate hosts as discussed, and then share the different SDN environment specific global VTEP lists with one another by transmitting the different SDN environment specific global VTEP lists to one another. The CCPs may then take all the different SDN environment specific global VTEP lists created by the individual CCPs, and combine them into the final global VTEP list that includes all VTEPs from all SDN environments. Accordingly, each CCP in each SDN environment includes the same global VTEP list with all VTEPs in all hosts across all SDN environments.

In certain aspects, each CCP is aware of which hosts are controlled by the CCP. Accordingly, when configuring hosts controlled by the CCP with the global VTEP list, the CCP may only include VTEPs in the global VTEP list that are in a different SDN environment than the one controlled by the CCP. Accordingly, the global VTEP list at each host controlled by the CCP only includes VTEPs on hosts not controlled by the CCP. Therefore, when a VTEP on a host is running in global replication mode, it only replicates packets to VTEPs on hosts outside the same SDN environment as the host, and may further send packets to hosts within the same SDN environment according to the other logical switch entries in the VTEP list. This may help reduce the amount of replication performed since the VTEP list will be updated for any topology changes in the same SDN environment as the host, such that packets do not need to be replicated to such VTEPs as they will be accounted for in the other logical switch entries in the VTEP list.

Figure 7:
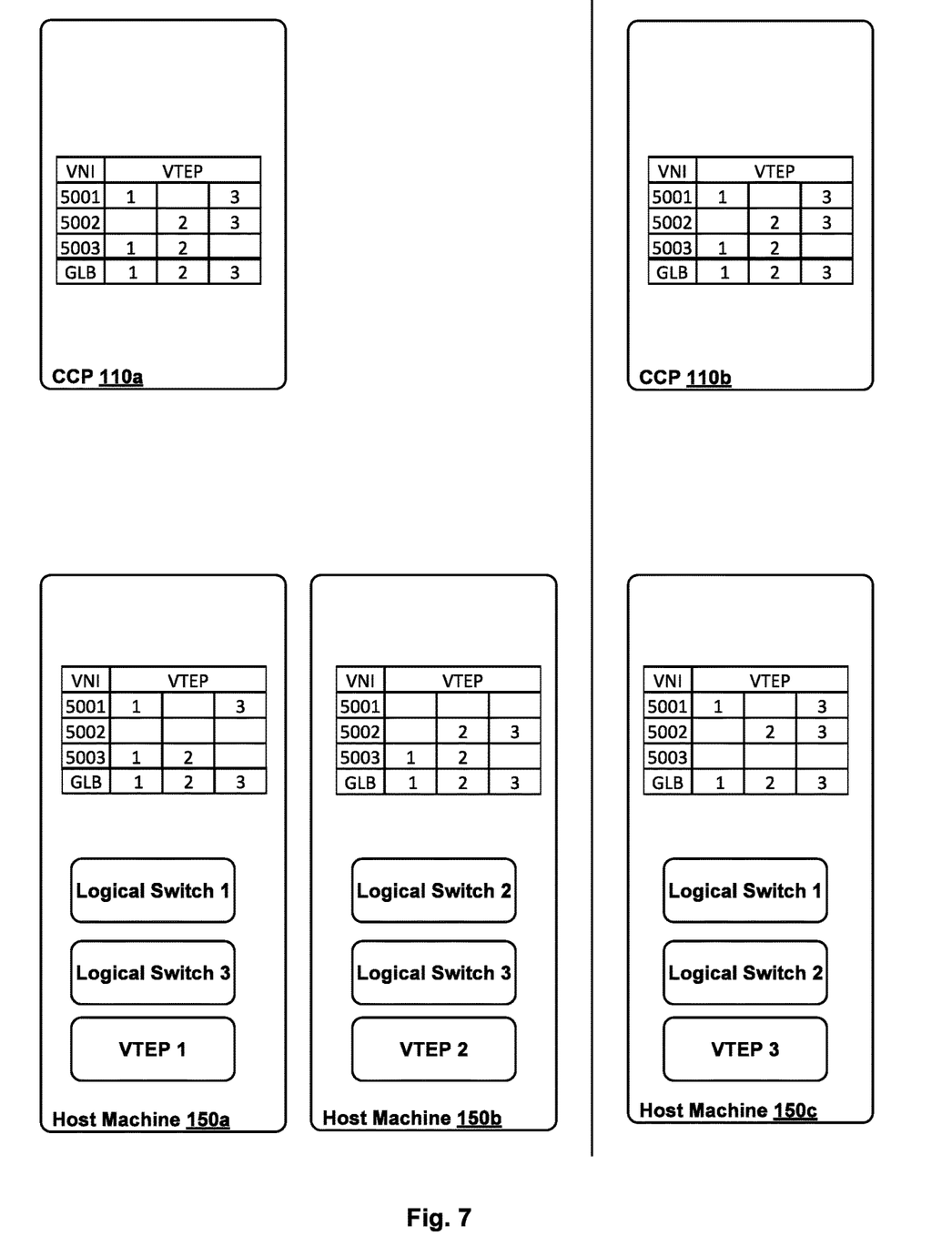
FIG. 7 illustrates example VTEP tables at hosts, according to an embodiment.

FIG. 7 illustrates example VTEP tables including a global VTEP list at hosts 150a-150c. In particular, FIG. 7 shows the same configuration as FIG. 3, but with the global VTEP list added to the VTEP tables on each of CCP 110a, CCP 110b, and hosts 150a-150c. As shown, each of the VTEP tables on each of CCP 110a, CCP 110b, and hosts 150a-150c includes the same global VTEP list with VNI "GLB" associated with all of the VTEPs 1-3.

Figure 8:
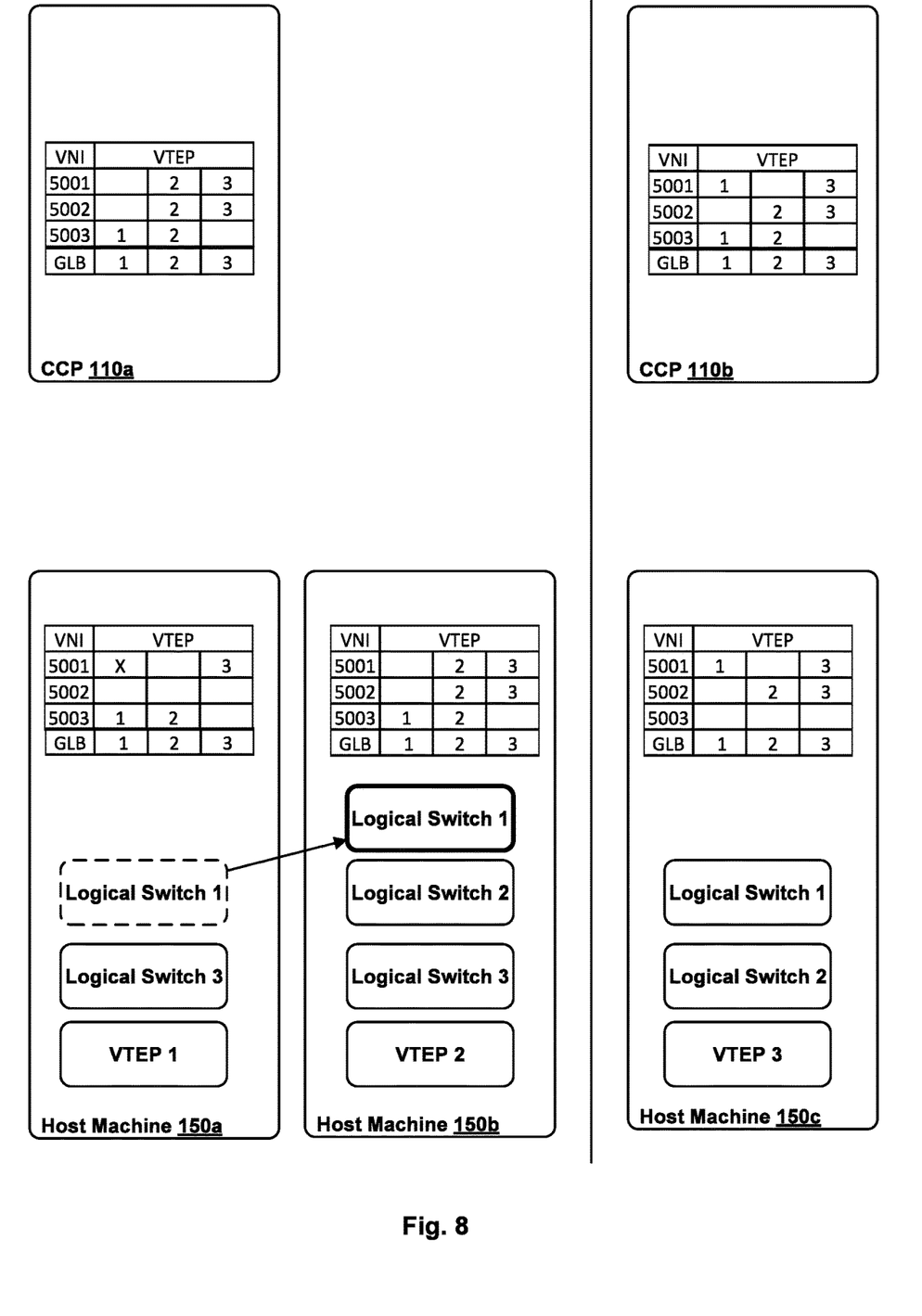
FIG. 8 illustrates example VTEP tables at hosts based on a VM moving from one host to another, according to an embodiment.

FIG. 8 illustrates example VTEP tables at hosts 150a-150c based on a VM moving from one host to another. In particular, FIG. 8 shows the same change as discussed with respect to FIG. 4. However, unlike in FIG. 4, connectivity issues do not arise due to the movement of the VM.

For example, a VM coupled to logical switch 1 on host 150c may generate a BUM packet, such as an ARP, and send it to VTEP 3 with the expectation that it is sent to all devices on logical switch 1. The VM may send the ARP, for example, to try to determine the MAC address of a device associated with an IP address to which the VM is trying to send packets. Based on the VTEP table alone at host 150c without the global VTEP list, VTEP 3 would send the packet to only VTEP 1 on host machine 150a as discussed, and therefore any VMs coupled to logical switch 1 on host 150b would not receive the packet. However, using the global VTEP list, VTEP 3 replicates the BUM packet to each of VTEP 1 and VTEP 2 on hosts 150a and 150b, respectively. VTEP 1 may ignore or not forward the packet based on no VMs being coupled to logical switch 1 on host 150a. However, VTEP 2 can forward the packet based on VMs being coupled to logical switch 1 on host 150b. Accordingly, the connectivity issues discussed with respect to FIG. 4 are resolved based on the embodiments discussed herein. The appropriate destination VM, such as on host 150b, may then respond to the ARP. VTEP 3 may receive the ARP response and update its VTEP tables for future packets sent to the IP address so they are only encapsulated and sent to the appropriate VTEP, such as VTEP 2.

Figure 9:
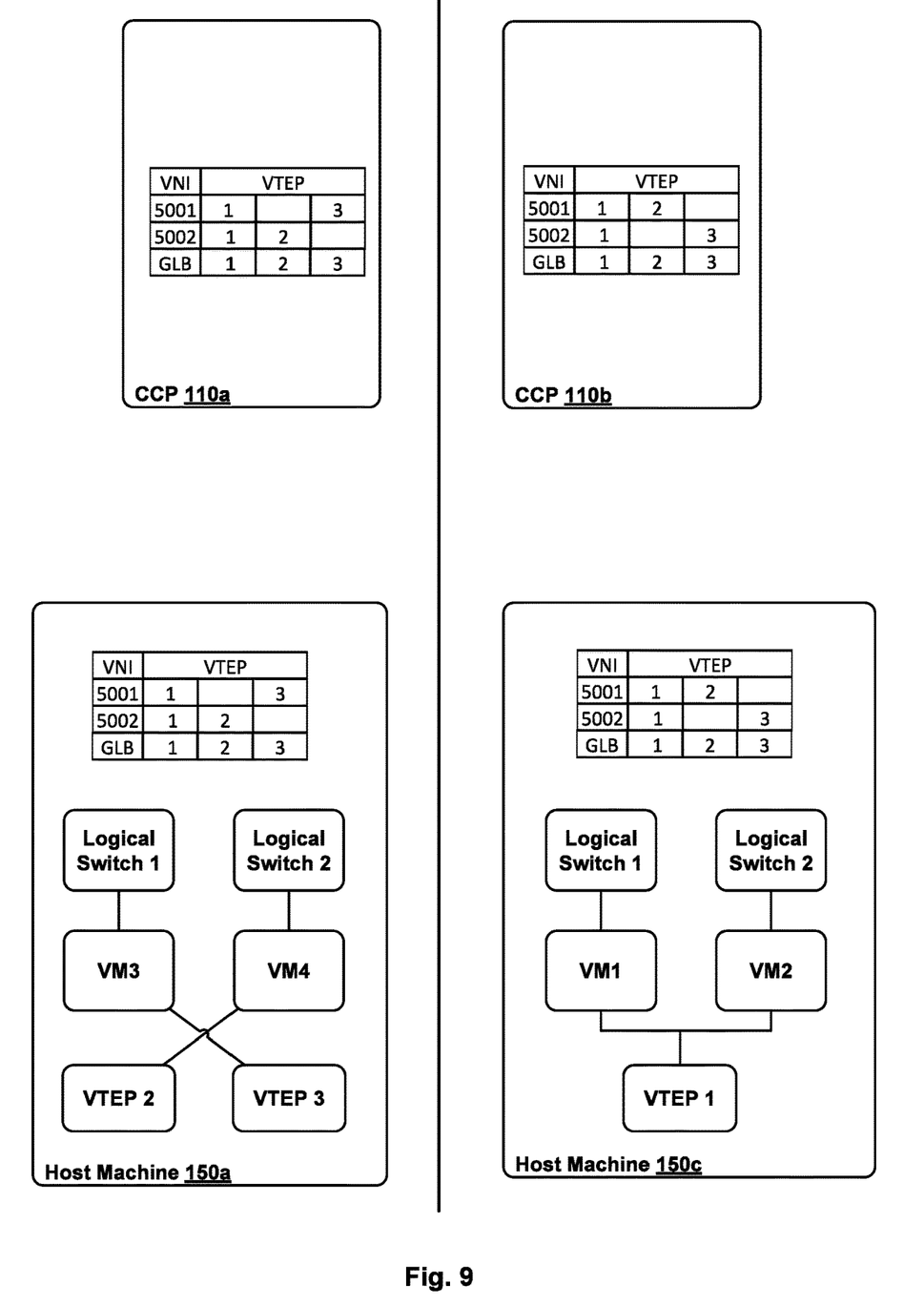
FIG. 9 illustrates example VTEP tables at hosts based on a change in VM to VTEP mapping, according to an embodiment.

FIG. 9 illustrates example VTEP tables at hosts 150a and 150c based on a change in VM to VTEP mapping (e.g., for multi-VTEP teaming). In particular, FIG. 9 shows the same change as discussed with respect to FIG. 6. However, unlike in FIG. 6, connectivity issues do not arise due to the movement of the VM.

For example, VM2 coupled to logical switch 2 on host 150c may generate a BUM packet, such as an ARP, and send it to VTEP 1 with the expectation that it is sent to all devices on logical switch 2. Based on the VTEP table alone at host 150c without the global VTEP list, VTEP 1 would send the packet to only VTEP 3 on host machine 150a as discussed, and therefore VM4 coupled to logical switch 2 via VTEP 2 would not receive the packet. However, using the global VTEP list, VTEP 1 replicates the BUM packet to each of VTEP 2 and VTEP 3 on host 150a. VTEP 3 may ignore or not forward the packet based on no VMs being coupled to logical switch 2 and associated with VTEP 3. However, VTEP 2 can forward the packet based on VM4 being coupled to logical switch 2 associated with VTEP 2. Accordingly, the connectivity issues discussed with respect to FIG. 6 are resolved based on the embodiments discussed herein. VM4 on host 150a may then respond to the ARP (e.g., if the ARP was for VM4's IP address). VTEP 1 may receive the ARP response and update its VTEP tables for future packets sent to the IP address of VM4 so they are only encapsulated and sent to VTEP 2.

The various aspects described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more aspects of the invention may be useful machine operations. In addition, one or more aspects of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various aspects described herein may be practiced with other computer system configurations including handheld devices, microprocessor systems, microprocessor-based or programmable consumer electronics, minicomputers, mainframe computers, and the like.

One or more aspects of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more aspects of the present invention have been described in some detail for clarity of understanding, it will be apparent that certain changes and modifications may be made within the scope of the claims. Accordingly, the described aspects are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various aspects may be implemented as hosted aspects, non-hosted aspects or as aspects that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of communicating between a plurality of hosts comprising one or more first hosts controlled by a first control plane and one or more second hosts controlled by a second control plane, each of the one or more first hosts running at least one tunneling endpoint of one or more first tunneling endpoints, and each of the one or more second hosts running at least one tunneling endpoint of one or more second tunneling endpoints, the method comprising:

storing, by at least one of the one or more first hosts, a global list identifying at least the one or more second tunneling endpoints;

configuring the second control plane, by the first control plane, with the global list prior to migrating the one or more second hosts from control by the first control plane to control by the second control plane;

receiving a packet at the one of the one or more first tunneling endpoints;

replicating and encapsulating the packet for transmission to each of the one or more second tunneling endpoints based on the global list; and transmitting the encapsulated packet to each of the one or more second tunneling endpoints.

2. The method of claim 1, wherein the global list further identifies the one or more first tunneling endpoints, and further comprising:

replicating and encapsulating the packet for transmission to each of the one or more first tunneling endpoints other than the one of the one or more first tunneling endpoints based on the global list; and transmitting the encapsulated packet to each of the one or more first tunneling endpoints other than the one of the one or more first tunneling endpoints.

3. The method of claim 1, wherein the packet is a broadcast, unknown unicast, or multicast (BUM) packet, and wherein replicating and encapsulating the packet for transmission to each of the one or more second tunneling endpoints is further based on the packet being a BUM packet.

4. The method of claim 1, wherein the one of the one or more first tunneling endpoints is associated with a flag indicating a global replication mode, and wherein replicating and encapsulating the packet for transmission to each of the one or more second tunneling endpoints is further based on the flag.

5. The method of claim 1, wherein at least one of the one or more second tunneling endpoints is not associated with any logical switches associated with the one of the one or more first tunneling endpoints.

6. The method of claim 1, wherein each of the one or more first hosts stores a tunneling endpoint table associating logical switches with tunneling endpoints, and wherein the global list is implemented as an entry in the tunneling endpoint table corresponding to a logical switch with a global identifier.

7. A host of one or more first hosts configured to perform a method of communicating between a plurality of hosts comprising the one or more first hosts controlled by a first control plane and one or more second hosts controlled by a second control plane, each of the one or more first hosts running at least one tunneling endpoint of one or more first tunneling endpoints, and each of the one or more second hosts running at least one tunneling endpoint of one or more second tunneling endpoints, comprising:

a non-transitory memory comprising executable instructions; and a processor in data communication with the memory and configured to execute the executable instructions to cause the host to:

store a global list identifying at least the one or more second tunneling endpoints;

receive a packet at one of the one or more first tunneling endpoints;

replicate and encapsulate the packet for transmission to each of the one or more second tunneling endpoints based on the global list; and transmit the encapsulated packet to each of the one or more second tunneling endpoints, wherein the second control plane is configured, by the first control plane, with the global list prior to migrating the one or more second hosts from control by the first control plane to control by the second control plane.

8. The host of claim 7, wherein the global list further identifies the one or more first tunneling endpoints, and wherein the processor is further configured to execute the executable instructions to cause the host to:

replicate and encapsulate the packet for transmission to each of the one or more first tunneling endpoints other than the one of the one or more first tunneling endpoints based on the global list; and transmit the encapsulated packet to each of the one or more first tunneling endpoints other than the one of the one or more first tunneling endpoints.

9. The host of claim 7, wherein the packet is a broadcast, unknown unicast, or multicast (BUM) packet, and wherein replicating and encapsulating the packet for transmission to each of the one or more second tunneling endpoints is further based on the packet being a BUM packet.

10. The host of claim 7, wherein the one of the one or more first tunneling endpoints is associated with a flag indicating a global replication mode, and wherein replicating and encapsulating the packet for transmission to each of the one or more second tunneling endpoints is further based on the flag.

11. The host of claim 7, wherein at least one of the one or more second tunneling endpoints is not associated with any logical switches associated with the one of the one or more first tunneling endpoints.

12. The host of claim 7, wherein each of the one or more first hosts stores a tunneling endpoint table associating logical switches with tunneling endpoints, and wherein the global list is implemented as an entry in the tunneling endpoint table corresponding to a logical switch with a global identifier.

13. A non-transitory computer readable medium having instructions stored thereon for performing a method of communicating between a plurality of hosts comprising one or more first hosts controlled by a first control plane and one or more second hosts controlled by a second control plane, each of the one or more first hosts running at least one tunneling endpoint of one or more first tunneling endpoints, and each of the one or more second hosts running at least one tunneling endpoint of one or more second tunneling endpoints, the method comprising:

storing, by at least one of the one or more first hosts, a global list identifying at least the one or more second tunneling endpoints;

receiving a packet at the one of the one or more first tunneling endpoints;

replicating and encapsulating the packet for transmission to each of the one or more second tunneling endpoints based on the global list; and transmitting the encapsulated packet to each of the one or more second tunneling endpoints, wherein the second control plane is configured, by the first control plane, with the global list prior to migrating the one or more second hosts from control by the first control plane to control by the second control plane.

14. The non-transitory computer readable medium of claim 13, wherein the global list further identifies the one or more first tunneling endpoints, and wherein the method further comprises:

replicating and encapsulating the packet for transmission to each of the one or more first tunneling endpoints other than the one of the one or more first tunneling endpoints based on the global list; and transmitting the encapsulated packet to each of the one or more first tunneling endpoints other than the one of the one or more first tunneling endpoints.

15. The non-transitory computer readable medium of claim 13, wherein the packet is a broadcast, unknown unicast, or multicast (BUM) packet, and wherein replicating and encapsulating the packet for transmission to each of the one or more second tunneling endpoints is further based on the packet being a BUM packet.

16. The non-transitory computer readable medium of claim 13, wherein the one of the one or more first tunneling endpoints is associated with a flag indicating a global replication mode, and wherein replicating and encapsulating the packet for transmission to each of the one or more second tunneling endpoints is further based on the flag.

17. The non-transitory computer readable medium of claim 13, wherein at least one of the one or more second tunneling endpoints is not associated with any logical switches associated with the one of the one or more first tunneling endpoints.

* * * * *